United States Patent
Yamagata et al.

(10) Patent No.: US 7,256,942 B2
(45) Date of Patent: Aug. 14, 2007

(54) SINGLE LENS ELEMENT, LIGHT SOURCE DEVICE AND SCANNING OPTICAL DEVICE

(75) Inventors: Michihiro Yamagata, Osaka (JP);
Motonobu Yoshikawa, Osaka (JP);
Yasuhiro Tanaka, Hyogo (JP);
Yoshiharu Yamamoto, Osaka (JP);
Daizaburo Matsuki, Osaka (JP);
Masaru Fujita, Osaka (JP); Toshihiko Shibita, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/571,294

(22) PCT Filed: Sep. 9, 2004

(86) PCT No.: PCT/JP2004/013498

§ 371 (c)(1),
(2), (4) Date: Mar. 9, 2006

(87) PCT Pub. No.: WO2005/026805

PCT Pub. Date: Mar. 24, 2005

(65) Prior Publication Data
US 2007/0097523 A1    May 3, 2007

(30) Foreign Application Priority Data
Sep. 9, 2003    (JP)    ............... 2003-316365

(51) Int. Cl.
*G02B 3/00*    (2006.01)
*G02B 27/42*    (2006.01)

(52) U.S. Cl. ............. 359/642; 359/563; 359/566; 359/737

(58) Field of Classification Search ........... 359/563, 359/566, 642, 737
See application file for complete search history.

(56) References Cited

U.S. PATENT DOCUMENTS

| 5,212,501 | A | 5/1993 | Nakamura et al. |
| 6,094,286 | A | 7/2000 | Kato |
| 6,101,020 | A | 8/2000 | Ori |

FOREIGN PATENT DOCUMENTS

| JP | 62-141511 A | 6/1987 |
| JP | 4-328512 A | 11/1992 |

(Continued)

*Primary Examiner*—Scott J. Sugarman
*Assistant Examiner*—Darryl J. Collins
(74) *Attorney, Agent, or Firm*—McDermott Will & Emery LLP

(57) ABSTRACT

A single lens element used for converting a divergent pencil of rays, radiated from a light source, into a predetermined convergent state, wherein
the single lens element is made from a resin and has a positive optical power due to a refraction effect and a positive optical power due to a diffraction effect,
the diffraction effect is based on a diffraction structure formed on at least one of an incident side surface and an exit side surface of the single lens element, and
the following expressions are satisfied:

$0.1 < NA < 0.3$ $0.4 < T/f < 0.75$ $2.2 < fr/f < 3$ here,
f is a focal length of the entire single lens element,
fr is a focal length due to the refraction effect of the single lens element,
T is a thickness of the single lens element on an optical axis, and
NA is a numerical aperture of a single lens element at an incident side.

24 Claims, 4 Drawing Sheets

FOREIGN PATENT DOCUMENTS

| | | |
|---|---|---|
| JP | 4-328516 A | 11/1992 |
| JP | 6-118346 A | 4/1994 |
| JP | 11-274646 A | 10/1999 |
| JP | 2000-171741 A | 6/2000 |
| JP | 10-68903 A | 7/2000 |
| JP | 2001-159731 A | 6/2001 |
| JP | 2004-126192 A | 4/2004 |

SINGLE LENS ELEMENT, LIGHT SOURCE DEVICE AND SCANNING OPTICAL DEVICE

TECHNICAL FIELD

The present invention relates to a single lens element having a positive optical power due to a refraction effect, and a positive optical power due to a diffraction effect, and more particularly relates to a single lens element suitable for a light source device of a scanning optical device and an optical disk device.

BACKGROUND ART

A scanning optical device used for a LBP (Laser Beam Printer) and others scans a bundle of rays from a semiconductor laser element by using a light deflector, and has an effect of imaging on a photoconductor drum by using a scanning optical system, wherein the semiconductor laser element is a light source and the photoconductor drum is a surface subjected to scanning. In such scanning optical device, when there is a change in an environmental temperature, a wavelength of a bundle of rays and a refractive index of a lens element included in an optical system change accordingly. Thus, the scanning optical device is required to be designed such that a movement of a focal position in accordance with an environmental temperature change is sufficiently reduced. For example, in the scanning optical device there is used a lens system for parallelizing a divergent bundle of rays radiated from a semiconductor laser element, or converting into a convergent bundle of rays (the lens for parallelization is specifically called "collimate lens"), and for such lens system there is generally used a glass lens element having a small refractive index change against a temperature change.

On the other hand, in Japanese Laid-Open Patent Publication No. 04-328512 there is proposed a method of further simplifying this lens system by combining a lens having a diffraction effect with a laser light source, and reducing a deviation in an imaging position due to a temperature change by fixing a focal length.

In addition, in Japanese Laid-Open Patent Publication No. 04-328516 is disclosed a method of using a Fresnel lens for the collimate lens, and compensating defocus of the scanning optical system due to a temperature change by combining: a wavelength change of a laser light source in accordance with a temperature change; a focal length change of the Fresnel lens; and a change due to an expansion in a lens barrel member of the Fresnel lens.

Furthermore, in Japanese Laid-Open Patent Publication No. 06-118346 there is disclosed a method of offsetting a change in a focal length of the collimate lens against temperature by combining a Fresnel lens with a refractive lens.

DISCLOSURE OF THE INVENTION

Since the above conventional arts both employ an extremely thin Fresnel lens, there has been a problem of an excess degree of fluctuation in an aberration caused by profile irregularity due to a temperature change. In order to solve such problem, if a thickness of the Fresnel lens is merely increased, defects such as having a weld line occur at a time of injection molding, which lead to a cost increase.

One of the differences between a glass lens and a resin lens is a difference in a degree of refractive index change due to a temperature change, which the above method indicates to have solved by integrating diffraction lenses. However, the resin lens described in a conventional example is often subjected to a lens distortion by a stress generated due to an adhesive when the lens is fixed by the adhesive. Such distortion causes a coma aberration or an astigmatism to the lens, and severely impairs a lens performance. Thus, though the lens is fixed to a lens barrel and the lens barrel is adhered on an optical base, from a view of cost reduction, it is preferable to directly adhere the lens on the optical base without employing the lens barrel.

Taking the above into consideration, an object of the present invention is to provide a single lens element, a light source device and an optical disk device, operable to maintain a stable performance even when subjected to a temperature change.

In order to achieve the above object, a single lens element according to a first aspect of the present invention is: a single lens element used for converting a divergent pencil of rays, radiated from a light source, into a predetermined convergent state, wherein the single lens element is made from a resin and has a positive optical power due to a refraction effect and a positive optical power due to a diffraction effect, the diffraction effect is based on a diffraction structure formed on at least one of an incident side surface and an exit side surface of the single lens element, and the following expressions are satisfied:

$$0.1 < NA < 0.3$$

$$0.4 < T/f < 0.75$$

$$2.2 < fr/f < 3$$

here, f is a focal length of the entire single lens element, fr is a focal length due to the refraction effect of the single lens element, T is a thickness of the single lens element on an optical axis, and NA is a numerical aperture of a single lens element at an incident side.

In addition, in order to achieve the above object, a light source device according to a second aspect of the present invention is: a light source device for emitting a bundle of rays having a predetermined convergent state, comprising:

a semiconductor laser element which radiates a divergent bundle of rays, and has a characteristic of shifting toward a direction in which a wavelength of the radiated bundle of rays in accordance with rise in an environmental temperature;

the single lens element according to the first aspect of the present invention for converting the divergent bundle of rays radiated from the semiconductor laser element, into a predetermined convergent state; and holding means for integrally holding the semiconductor laser element and the single lens element.

In order to achieve the above object, a scanning optical device according to a third aspect of the present invention is: a scanning optical device for imaging and scanning a bundle of rays on a surface to be scanned as a spot, comprising:

a light source device for emitting a bundle of rays having a predetermined convergent state;

an optical deflector for main scanning by reflecting and deflecting the bundle of rays emitted from the light source device on a deflection surface;

a first imaging optical system for imaging the bundle of rays emitted from the light source device into a linear image extending in a main scanning direction in the neighborhood of the deflection surface of the optical deflector; and a second imaging optical system comprising a scanning lens for re-imaging the bundle of rays imaged by the first imaging optical system on the surface to be scanned as a spot, wherein the light source device comprises:

a semiconductor laser element which radiates a divergent bundle of rays, and has a characteristic of shifting toward a direction in which a wavelength of the radiated bundle of rays in accordance with rise in an environmental temperature;

the single lens element according to the first aspect of the present invention for converting the divergent bundle of rays radiated from the semiconductor laser element, into a predetermined convergent state; and holding means for integrally holding the semiconductor laser element and the single lens element.

According to the present invention, it is possible to provide a single lens element, a light source device and an optical disk device, maintaining a stable performance even when subjected to a temperature change.

BEST MODE FOR CARRYING OUT THE INVENTION

Embodiment 1

Figure 1:
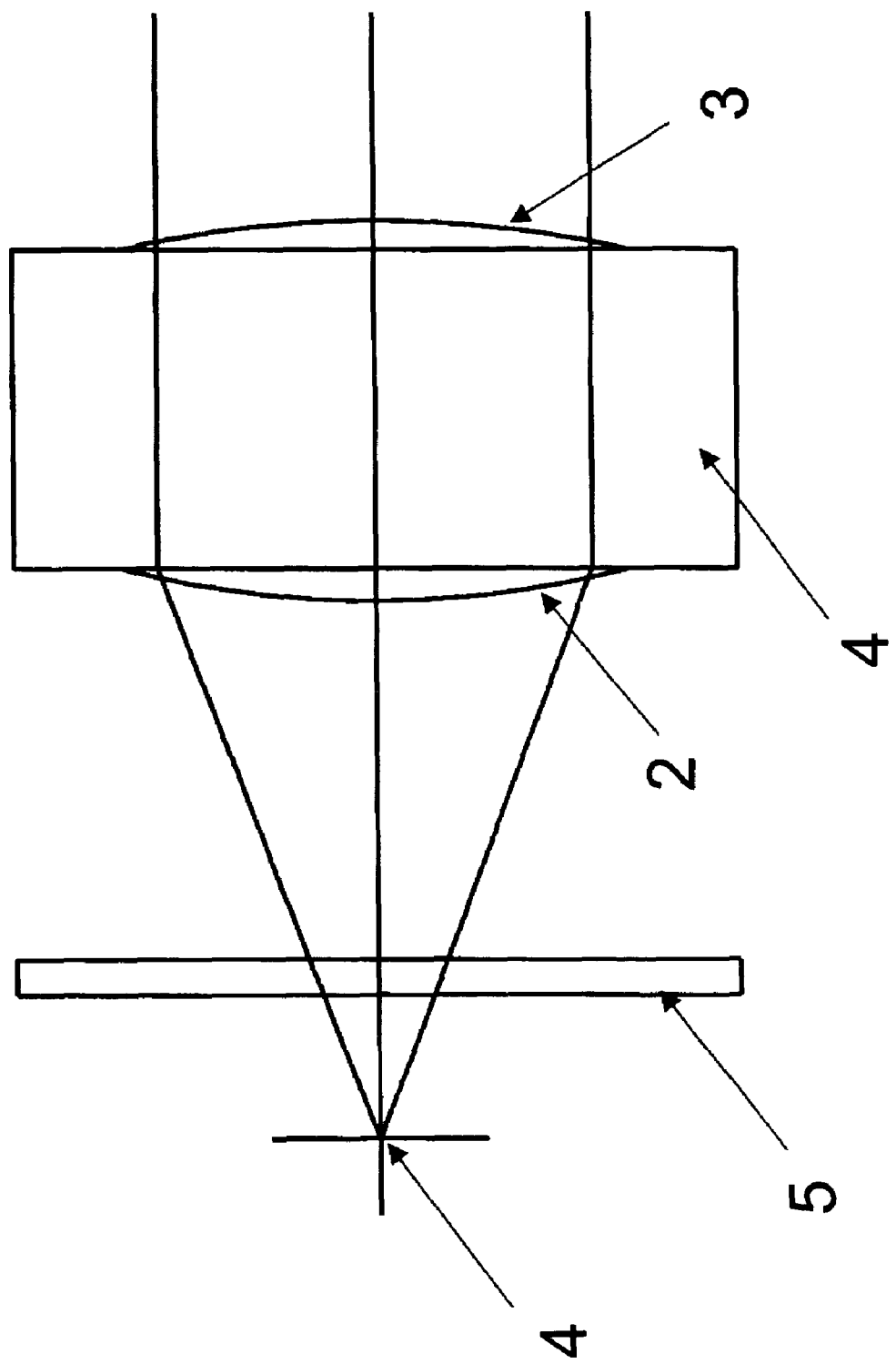
FIG. 1 is a schematic ray diagram of a single lens element according to Embodiments 1 and 2 of the present invention.

FIG. 1 is a schematic ray diagram of a single lens element according to Embodiment 1 of the present invention. In FIG. 1, 1 denotes the single lens element according to Embodiment 1, wherein an incident surface 2 and an exit surface 3 are aspherical surfaces. A diffraction structure is formed on a surface of the exit surface 3. A luminous point of a semiconductor laser element is denoted as 4, and 5 denotes a cover glass of the semiconductor laser element.

The single lens element 1 is a lens element having a bi-convex and bi-aspherical surface, made from a resin, and has a positive optical power due to a refraction effect and a positive optical power due to a diffraction effect. In addition, this diffraction effect is based on the diffraction structure formed on the surface of the exit surface 3. A condition to be satisfied by the single lens element 1 is described below.

The single lens element 1 satisfies the following expressions (1) to (3), $$0.1 < NA < 0.3 \tag{1}$$

$$0.4 < T/f < 0.75 \tag{2}$$

$$2.2 < fr/f < 3 \tag{3}$$

here, f is a focal length of the entire single lens element, fr is a focal length due to the refraction effect of the single lens element, T is a thickness of the single lens element on an optical axis, and NA is a numerical aperture of the single lens element at an incident side.

The expression (1) indicates an appropriate NA range of a lens element for converting a bundle of rays radiated from a semiconductor laser element.

The expression (2) shows an essential condition for satisfying both a moldability and an optical performance of the single lens element. When the upper limit is exceeded, the lens thickness becomes excessively large in contrast to an aperture of the single lens element, which tends to cause a weld line during injection molding. On the other hand, if the lower limit is exceeded, fluctuation of an aberration of the single lens element when subjected to a temperature change becomes large. In view of the above, it is more preferable that the following expression (4) is satisfied.

$$0.5 < T/f < 0.67 \tag{4}$$

For providing proper compensation to a movement of a focal position due to temperature when use in combination with a semiconductor laser, the expression (3) indicates an appropriate range of the ratio of a focal length due to a refraction effect to a focal length of an entire single lens element.

It is preferable that the single lens element 1 satisfies the following expression (5), $$0.8 < t/T < 0.97 \tag{5}$$

here, t is a thickness of the single lens element at a thinnest section of a surface having a curvature, when measuring a thickness of the single lens element in a direction parallel to an optical axis.

A single lens element which satisfies the expression (5) has a small difference in thickness between a center section and a peripheral section of the lens. It is preferable for resin molding. When the lower limit of the above expression is exceeded, productivity is deteriorated since the difference in thickness between the center section and the peripheral section of the single lens element becomes excessively large, and a large aberration is generated under a molding condition in which satisfactory transcription is performed. In addition, when the upper limit of the above expression is exceeded, a focal length of the single lens element due to a refraction effect becomes excessively long, thus as for an optical design, a satisfactory performance cannot be obtained when subjected to a temperature change. At the same time, when the above condition is satisfied, since sufficient edge thickness difference of the single lens element can be obtained, it is possible to directly adhere the single lens element on an optical base without using a lens barrel. In order to obtain a single lens element having both a satisfactory moldability and an aberration performance, it is more preferable that the expression (6) is satisfied.

$$0.85 < t/T < 0.95 \tag{6}$$

It is preferable that a focal length f of the single lens element 1 is within the following range.

$$5 \text{ mm} \leq f \leq 20 \text{ mm} \tag{7}$$

A single lens element appropriate for a scanning optical device can be provided when the single lens element is designed in accordance with the above range. Furthermore, it is more preferable that the single lens element satisfies the following range.

$$6 \text{ mm} \leq f \leq 10 \text{ mm} \tag{8}$$

It is preferable that both sides of the single lens element 1 are aspherical surfaces. When both sides are aspherical surfaces, specifically an off-axial aberration performance can be improved. Thus, a lens with a stable performance can be obtained.

In a case where both sides of the single lens element 1 are aspherical surfaces, it is preferable that the following expression (9) is satisfied.

$$8.5 \text{ mm} < f < 9.5 \text{ mm} \quad (9)$$

When the focal length of the single lens element is within this range, it is possible to obtain a lens system appropriate for the scanning optical device.

In a case where both sides of the single lens element 1 are aspherical surfaces, it is preferable that the following expression (10) is satisfied.

$$4.5 \text{ mm} < T < 5.5 \text{ mm} \quad (10)$$

If a center thickness is within this range, and when T satisfies the above expression, it is possible to obtain sufficient edge thickness difference, thus even when directly adhered to the optical base without using a lens barrel, the single lens element is less subjected to an influence of distortion by an adhesive.

In a case where both sides of the single lens element 1 are aspherical surfaces, it is preferable that the following expression (11) is satisfied.

$$14 \text{ mm} < fr < 18 \text{ mm} \quad (11)$$

When this is satisfied, it is possible to provide a lens having a stable performance within the above range of focal length when subjected to a temperature change.

In a case where both sides of the single lens element 1 are aspherical surfaces, it is preferable that the expression (5) is within the following range.

$$0.85 < t/T < 0.92 \quad (12)$$

The diffraction structure may be formed on both sides. When the diffraction structure is formed on both sides, it is possible to extend a pitch of the diffraction structure, which makes processing easier, and also reduces a loss in diffraction efficiency.

The lens data of the single lens element will be described below. In the following table, Surface number 1 indicates a luminous point, 2 and 3 indicate a cover glass of a laser, and 4 to 6 indicate a single lens element. Surface numbers 4 and 5 indicate aspherical surfaces of an incident surface and an exit surface of the lens. Surface number 6 indicates a diffraction structure formed on Surface number 5 by using an ultra high index method. Since the ultra high index method is described, for example, in "Describing holographic optical elements as lenses", J. Opt. Soc. Am., Vol. 67, No. 6 (1977) by William C. Sweatt, and details of a method for obtaining configuration data of an actual diffraction lens by using the ultra high index method is described, for example, in Japanese Laid-Open Patent Publication No. 10-133104, explanation of these methods are omitted here. Note that though in Embodiment 1, a design of the diffraction structure is described by using the above Sweatt's ultra high index method, it is needless to say that the present invention is not dependent on this design method, but other methods such as a phase function method may be used to attain the object.

TABLE 1

| Surface Number | Vertex Radius of Curvature (mm) | Axial Distance (mm) | Refractive Index |
|---|---|---|---|
| 1 | ∞ | 0.1 | |
| 2 | ∞ | 0.3 | 1.51116246 |
| 3 | ∞ | 5.415538 | |
| 4 | 16.25 | 6 | 1.503007437811 |
| 5 | −13.29937 | 0 | |
| 6 | −13.29816 | | |

The cover glass of a laser of Surface number 2 is BK7. Surface numbers 4 and 5 are aspherical surfaces in which a sag s of a surface at height h from the optical axis is indicated by the following expression, and each aspheric coefficient is indicated in the following table. Note that E denotes a power of 10, e.g., E-4 is −4th power of 10. Each of the aspherical surfaces described in the present embodiment is defined by the following expression.

$$S = \frac{ch^2}{1+\sqrt{1-(1+\kappa)c^2h^2}} + AD*h^4 + AE*h^6 + AF*h^8 + AG*h^{10}$$

In the above, c is a vertex curvature of a surface, and when a radius of the curvature is r, c=1/r is met.

Surface Number 4
K −10.08782
AD 8.6700583E-4
AE 1.030877E-4
AF −2.7032044E-5
AG 2.3029273E-6

Surface Number 5
K −0.1898852
AD 3.0331456E-4
AE 1.0002706E-5
AF 0.0
AG 0.0

Surface Number 6
K −0.1898817
AD 3.0331451E-4
AE 1.0003222E-5
AF −2.3128484E-16
AG −6.8102969E-15

A composite focal length f of the single lens element 1 is 9 mm, and a focal length due to a refraction effect indicated by Surface numbers 4 and 5 of the above lens data is 15.6 mm.

The change in an aberration performance when the lens is subjected to a temperature change, and a focal position change based on a setting temperature are shown below. A calculation is carried out by inverting the incident surface and the exit surface of the optical system described above to calculate as an optical system in which the bundle of rays enters from a parallel light side, and an image is formed at a luminous point side. With regards to Focal Position Change, algebraic sign represents a direction in which the focal length is increased as positive. As shown in Table 2, the focal length change is sufficiently reduced, thus it can be confirmed that sufficient performance as a light source of a scanning optical device is obtained in each case.

TABLE 2

|  | RMS Wavefront Aberration (m$\lambda$) | Focal Position Change ($\mu$m) |
| --- | --- | --- |
| Setting Temperature (35° C.) | 1.5 | 0 |
| Low Temperature (5° C.) | 6.3 | −0.2 |
| High Temperature (55° C.) | 4.6 | 0.3 |

In the above calculation, a wavelength change of the semiconductor laser element per 1° C. is provided as 0.2 nm, a refractive index change of a resin material per 1° C. is provided as −1.1E-4, and a coefficient of expansion of the resin material per 1° C. is provided as 1.00006. The wavelength and refractive index of the resin under this condition are indicated below. For the glass, only the refractive index change due to the wavelength change is taken into account, and the refractive index change and expansion-contraction due to temperature is ignored.

TABLE 3

|  | Wavelength of Light Source | Refractive Index of Resin |
| --- | --- | --- |
| Setting Temperature (35° C.) | 781 nm | 1.50300743 |
| Low Temperature (5° C.) | 776 nm | 1.50585233 |
| High Temperature (55° C.) | 786 nm | 1.50016469 |

Since edge thickness difference of the lens is sufficiently large with 5.3 mm, it is possible to satisfactorily reduce a distortion due to adherence when mounting the lens on a device.

Embodiment 2

A single lens element according to Embodiment 2 of the present invention will be described. The single lens element according to Embodiment 2 is another numerical example of the single lens element according to Embodiment 1, and since a schematic structure is common with Embodiment 1, FIG. 1 can be used for reference.

The design data of the single lens element according to Embodiment 2 is shown in the following table. A lens material and a cover glass of a laser used in the present embodiment are same as that of Embodiment 1. The single lens element has a NA of 0.3 and a focal length of 9 mm.

TABLE 4

| Surface Number | Vertex Radius of Curvature (mm) | Axial Distance (mm) | Refractive Index |
| --- | --- | --- | --- |
| 1 | ∞ | 0.1 |  |
| 2 | ∞ | 0.3 | 1.51116246 |
| 3 | ∞ | 5.77983 |  |
| 4 | 22. | 5.1 | 1.50300743 |
| 5 | −12.53457 | 0 | 7811 |
| 6 | −12.53346 |  |  |

Surface Number 4
K −3.89222407750E+001
AD 7.33171951000E-004
AE 5.06615284000E-005
AF 1.13311216000E-005
AG −1.02088015000E-006
 Surface Number 5
K −1.74988145430E-001
AD 2.45996406000E-004
AE 1.29128948000E-005
AF 0
AG 0.0
 Surface Number 6
K −1.74988114620E-001
AD 2.45996442000E-004
AE 1.29128905000E-005
AF 9.10330055000E-011

A focal length due to a refraction effect of the single lens element according to Embodiment 2 is 16.7 mm. The result of evaluation is shown in the following table. Calculation conditions for the evaluation is same as that of Embodiment 1.

TABLE 5

|  | RMS Wavefront Aberration (m$\lambda$) | Focal Position Change ($\mu$m) |
| --- | --- | --- |
| Setting Temperature (35° C.) | 1.9 | 0 |
| Low Temperature (5° C.) | 7.6 | 1.1 |
| High Temperature (55° C.) | 7.7 | −0.1 |

As shown in Table 5, the focal length change is sufficiently reduced, thus it can be confirmed that sufficient performance as a light source of a scanning optical device is obtained in each case.

Embodiment 3

Figure 2:
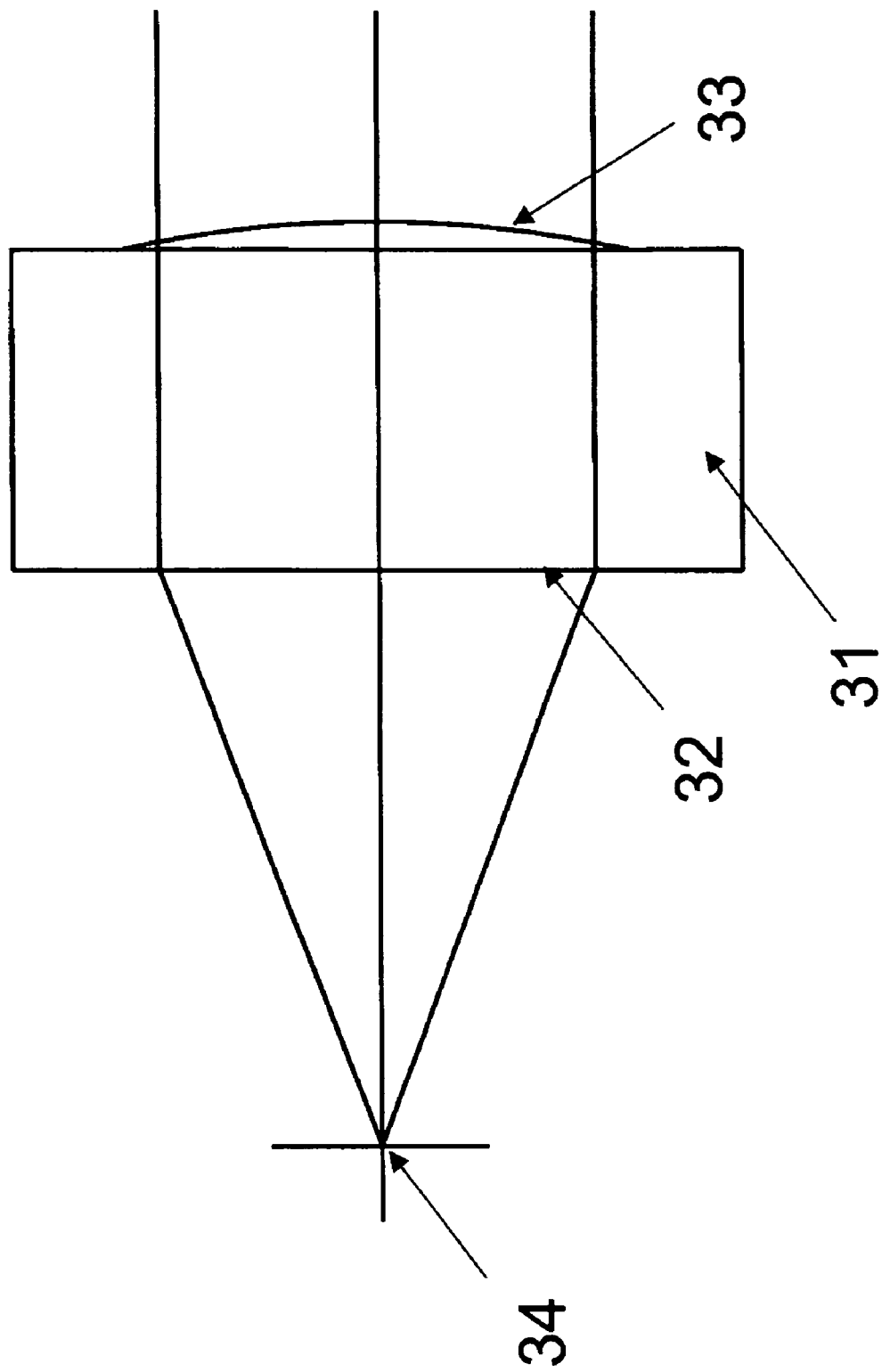
FIG. 2 is a schematic ray diagram of a single lens element according to Embodiment 3 of the present invention.

FIG. 2 is a schematic ray diagram of a single lens element according to Embodiment 3 of the present invention. In FIG. 2, 31 denotes the single lens element according to Embodiment 3, 32 denotes an incident surface, and 33 denotes an exit surface. A luminous point of a semiconductor laser element is indicated as 34. The incident surface 32 is a substantially flat surface, and a diffraction structure is formed on the surface. The exit surface 33 is an aspherical surface.

The single lens element 31 is a substantially planoconvex shape with a diffraction structure configured on a flat surface side. Generally, since a diffraction structure is configured with a microscopic undulation form of approximately several $\mu$m, processing is not easy. Thus, if a surface having the diffraction structure is made flat, it is possible to increase a degree of freedom for mold processing, since in addition to processing with a cutting tool, methods such as photolithography which are more suitable for microprocessing and has high precision are selectable at a time of mold processing.

When the single lens element 31 is a substantially planoconvex shape, it is preferable that the following expression is satisfied.

$$0.93 < t/T < 0.97 \qquad (13)$$

When the upper limit or the lower limit of the above is exceeded, a focal length of the refractive lens falls out from a suitable range.

When the single lens element 31 is a substantially planoconvex shape, it is preferable that the following expression is satisfied.

$$5.5 \text{ mm} < f < 6.5 \text{ mm} \qquad (14)$$

Generally, though an aperture increases as a focal length is lengthened, a case of using for example, a microprocessing technique such as EB lithography for processing a diffraction surface on a flat plate is disadvantageous since processing on a large area is time consuming. Thus, if a focal length which satisfies the expression (14) is selected, it is possible to benefit from a merit of processing on a flat plate.

When the single lens element 31 is a substantially plano-convex shape, it is preferable that the following expression is satisfied.

$$4 \text{ mm} < T < 4.5 \text{ mm} \tag{15}$$

The expression (15) shows a condition for maintaining, when one side of the single lens element is a flat surface, edge thickness difference to be sufficient without being excessively large in a thickness direction, and preventing molding problems such as having a weld line.

When the single lens element 31 is a substantially plano-convex shape, it is preferable that the following expression is satisfied.

$$10 \text{ mm} < fr < 15 \text{ mm} \tag{16}$$

The expression (16) shows a condition for properly compensating a movement in a focal position due to a temperature change for a lens having the above focal length.

The lens data of the single lens element will be shown below.

TABLE 6

| Surface Number | Vertex Radius of Curvature (mm) | Axial Distance (mm) | Refractive Index |
|---|---|---|---|
| 1 | ∞ | 4.83516 | |
| 2 | 65393.81 | 0 | 7811 |
| 3 | ∞ | 4.2 | 1.52351680 |
| 4 | −7.433941 | | |

The lens has a NA of 0.28, and a focal length of 6 mm. In the above data, Surface number 2 is a high refractive index surface indicating a diffraction structure, and 3 and 4 are refractive lens shape. Aspheric coefficient of Surface numbers 2 and 4 are shown below. A focal length due to a refraction effect which is indicated in 3 and 4 is 14.2 mm.

Surface Number 2
K −2.06426605680E+008
AD 1.04723455000E-008
AE 2.38433039000E-008
AF −2.83075212000E-009
AG 1.06739577000E-009

Surface Number 4
K −5.10250789240E-001
AD 3.48875424000E-004
AE 1.05358264000E-004
AF −1.63055940000E-005
AG 4.98271545000E-006

TABLE 7

| | RMS Wavefront Aberration (mλ) | Focal Position Change (μm) |
|---|---|---|
| Setting Temperature (35° C.) | 5.4 | 0 |
| Low Temperature (5° C.) | 1.5 | −0.2 |
| High Temperature (55° C.) | 9.9 | 0.17 |

As shown in Table 7, the focal length change is sufficiently reduced, thus it can be confirmed that sufficient performance as a light source of a scanning optical device is obtained in each case. A refractive index of a resin in Embodiment 3 is shown below.

TABLE 8

| | Wavelength of Light Source | Refractive Index of Resin |
|---|---|---|
| Setting Temperature (35° C.) | 781 nm | 1.5235168 |
| Low Temperature (5° C.) | 776 nm | 1.52575966 |
| High Temperature (55° C.) | 786 nm | 1.52127496 |

Embodiment 4

Figure 3:
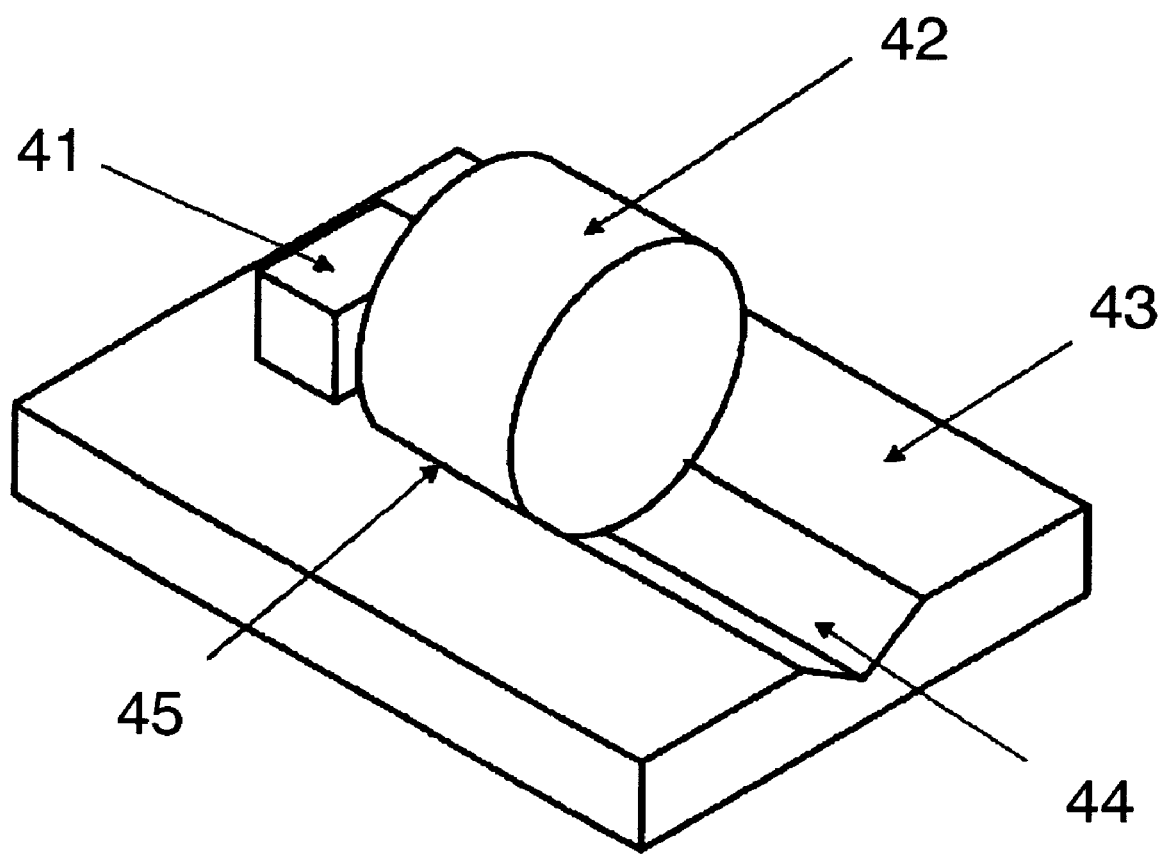
FIG. 3 is a schematic diagram of a light source device according to Embodiment 4 of the present invention.

FIG. 3 is a schematic structural diagram of a light source device according to Embodiment 4 of the present invention. An exit beam from a semiconductor laser 41 is emitted as a substantially parallel light from the single lens element 42 according to Embodiment 1. Here, the single lens element 42 comprises the same configuration as that of the single lens element described in Embodiment 1. The semiconductor laser 41 and the single lens element 42 are respectively fixed on a base 43. On the base 43 is formed a V-shaped groove 44 for fixing a lens. During assembling, it is possible to shift the lens 42 back and forth on the V-groove 44 for collimation, and after collimation, the lens can be fixed by adhering its side with a contact section 45 of the V-groove by an adhesive. Since a lens thickness of the lens of the present invention is sufficiently large, when fixed by an adhesive, the lens is less subjected to a stress generated by the adhesive. In addition, since it is possible to have a large contact area with the base, heat is easily transmitted, thus a temperature difference between the semiconductor laser 41 and the lens 42 is sufficiently reduced.

Furthermore, it is preferable that the semiconductor laser element 41 satisfies the following expressions.

$$775 \text{ nm} < \lambda < 810 \text{ nm} \tag{17}$$

$$640 \text{ nm} < \lambda < 680 \text{ nm} \tag{18}$$

The above expressions shows a wavelength of a widely-used semiconductor laser at present, thus a semiconductor laser which satisfies both performance and cost is available.

In the light source device according to Embodiment 4, the semiconductor laser element 41 and the single lens element 42 are held by an integral supporting means, and heat generation of the semiconductor laser element is transmitted to the single lens element 42 via the supporting means. With this configuration, a performance change of the single lens element 42 due to a temperature change can be corrected by a wavelength change of a light source due to the temperature change. Such a correction cannot be efficiently performed if there is a temperature difference between the semiconductor laser element and the single lens element. However, for the light source device of Embodiment 4, since both the semiconductor laser element and the single lens element are fixed on the integral supporting base, heat is transmitted via the supporting means, thus a heat difference is reduced, and when subjected to a temperature change, a stable performance can be provided.

Embodiment 5

Figure 4:
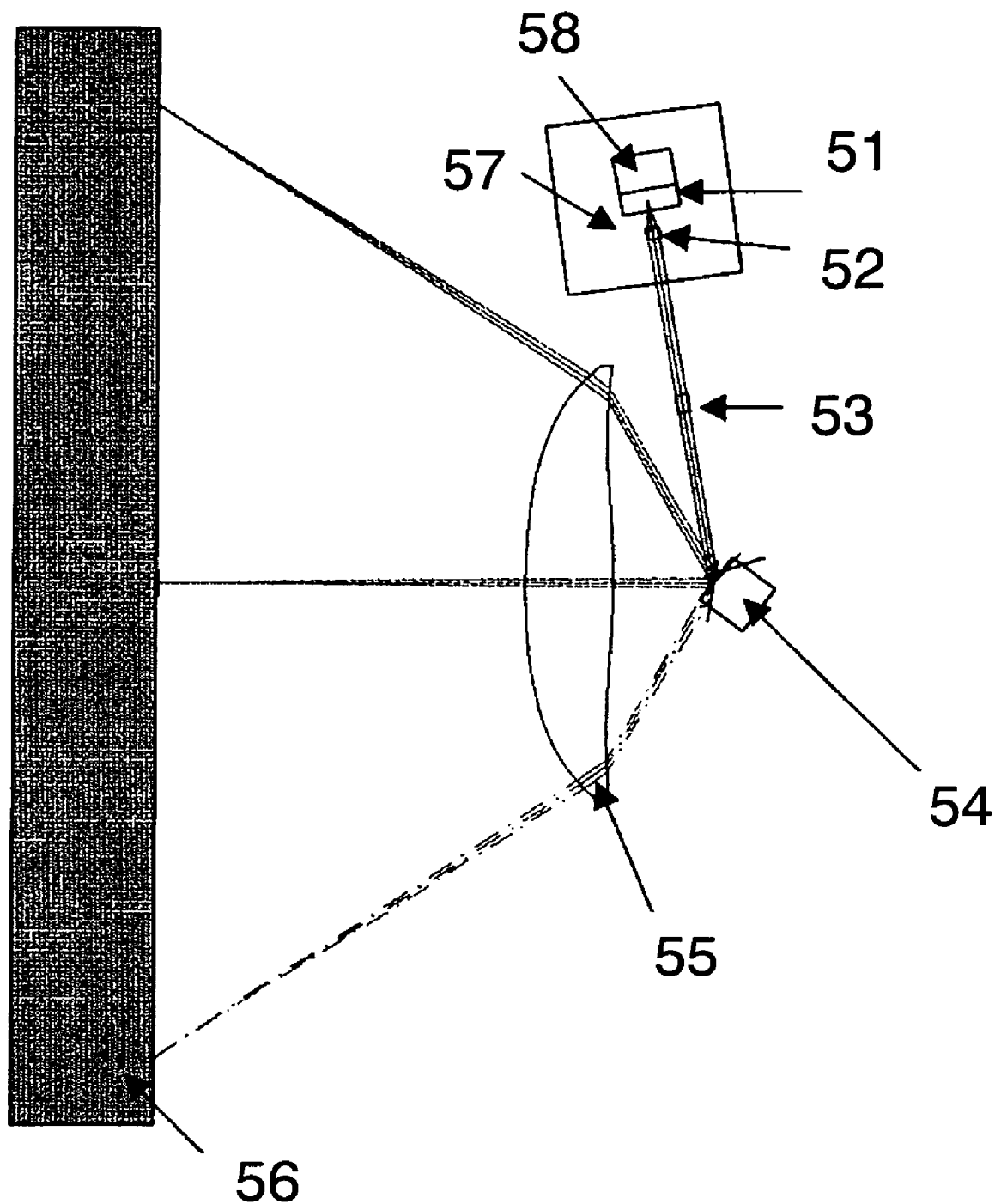
FIG. 4 is a schematic diagram of a scanning optical device according to Embodiment 5 of the present invention.

FIG. 4 is a diagram illustrating a schematic structure of a scanning optical device according to Embodiment 5 of the present invention. Its operation will be described below.

A bundle of beam from a semiconductor laser element 51 is converted to parallel rays, convergent rays or divergent rays by a single lens element 52, and enters into a cylindrical lens 53. In a vertical scanning direction, the bundle of beam is converged in the neighborhood of a reflecting surface of a polygon mirror 54. Here, the single lens element 52 has the same structure as that of the single lens element described in Embodiment 1. The polygon mirror 54 rotates upon a rotation central axis, and deflects an incident bundle of rays to be converged and scanned on a photoconductor drum 56 by an f-θ lens 55. The f-θ lens 55 is arranged such that a deflection point and a scanning surface on the photoconductor drum 56 are optically conjugated in the vertical scanning direction, and corrects a face tangle of the polygon mirror 54, and also corrects a curvature of field and a f-θ characteristic. In addition, the semiconductor laser element 51 and the single lens element 52 are fixed on an optical base 57. In the present structure, since the single lens element according to Embodiment 1 is employed as a single lens element, even as the single lens element, a stable performance against temperature is obtained. Thus, in comparison with a conventional optical system which configures a stable optical system against temperature by using a plurality of lenses, lenses from a light source to the cylindrical lens 53 are simplified, and miniaturization and cost reduction can be accomplished. In addition, since the semiconductor laser 51 and the collimate lens 52 comprising the single lens element of the present invention are directly fixed on the common optical base, a temperature difference is reduced, and a temperature compensation effect of the lens is sufficiently obtained. Furthermore, the semiconductor laser element is generally a heat generation source whose temperature rises when a power is supplied to a device, thus having a temperature difference with the lens. Therefore, it is more preferable that the temperature difference is further reduced by providing a radiator plate 58 or the like to the semiconductor laser element for mitigating rise in temperature. In addition, though in the present example there is described a configuration of only having the semiconductor laser 51 and the collimate lens 52 placed on the optical base, it is not limited thereto, and the configuration may further have the cylindrical lens 53 and the f-θ lens 55 placed on the optical base. Furthermore, it is needless to say that a configuration having each lens provided on a body of the scanning optical system also serves a purpose of the present invention.

The semiconductor laser element 51 is a light source whose emission wavelength changes in a direction to be increased in accordance with rise in environmental temperature. Based on such characteristic, it is possible to compensate a deviation in a focal position of the single lens element due to a temperature change by a change in an emission wavelength of the light source due to the temperature change. Thus, a scanning optical device having a stable characteristic against a temperature change can be obtained.

The scanning optical device according to Embodiment 5 has temperature transmission means for reducing a temperature difference between the semiconductor laser element 51 and the single lens element 52. The single lens element according to the present invention improves a temperature characteristic by utilizing a wavelength change in accordance with a temperature change of the semiconductor laser. Therefore, a degradation in performance due to temperature cannot be sufficiently corrected when there is a temperature difference.

In addition, the scanning optical device according to Embodiment 5 has a configuration in which the light source device and the single lens element are fixed on a common member, and heat generated by the light source section is transmitted to the collimate means via the member. According to the above configuration, heat of the light source device is transmitted to the single lens element, thus it is possible to reduce a temperature difference between the two.

Furthermore, the light source device in the scanning optical device according to Embodiment 5 has heat radiating means. Since the light source device is generally a heat generation source, a temperature rises faster than the lens specifically when a starting power is supplied, thus a temperature difference between the lens and the light source is generated. Since the heat radiating means can mitigate rise in temperature of the light source section, a temperature difference between the light source section and the lens can be reduced, thus a performance of the lens of the present invention can be sufficiently provided.

INDUSTRIAL APPLICABILITY

The present invention is suitable for a light source device included in a scanning optical device such as a LBP, and for a light source device of an optical disk device such as a CD (Compact Disk) and various DVDs.

The invention claimed is:

1. A single lens element used for converting a divergent pencil of rays, radiated from a light source, into a predetermined convergent state, wherein
    the single lens element is made from a resin and has a positive optical power due to a refraction effect and a positive optical power due to a diffraction effect,
    the diffraction effect is based on a diffraction structure formed on at least one of an incident side surface and an exit side surface of the single lens element, and
    following expressions are satisfied:

$0.1 < NA < 0.3$ $0.4 < T/f < 0.75$ $2.2 < fr/f < 3$ wherein,
    f is a focal length of the entire single lens element,
    fr is a focal length due to the refraction effect of the single lens element,
    T is a thickness of the single lens element on an optical axis, and
    NA is a numerical aperture of a single lens element at an incident side.

2. The single lens element according to claim 1, wherein a following expression is satisfied:

$0.8 < t/T < 0.97$ wherein,
    it is a thickness of the single lens element at a thinnest section of a surface having a curvature, when measuring a thickness of the single lens element in a direction parallel to an optical axis.

3. The single lens element according to claim 2, wherein a following expression is satisfied:

$0.85 < t/T < 0.95$.

4. The single lens element according to claim 1, wherein a following expression is satisfied:

$0.5 < T/f < 0.67$.

5. The single lens element according to claim 1, wherein a following expression is satisfied:

5 mm≦f≦20 mm.

6. The single lens element according to claim 5, wherein a following expression is satisfied:

6 mm≦f≦10 mm.

7. The single lens element according to claim 1, wherein the single lens element is a substantially planoconvex shape, and the diffraction structure is formed on a flat surface side.

8. The single lens element according to claim 7, wherein a following expression is satisfied:

5.5 mm≦f≦6.5 mm.

9. The single lens element according to claim 7, wherein a following expression is satisfied:

4 mm<T<4.5 mm.

10. The single lens element according to claim 7, wherein a following expression is satisfied:

10 mm<fr<15 mm.

11. The single lens element according to claim 7, wherein a following expression is satisfied:

0.93<t/T<0.97.

12. The single lens element according to claim 1, wherein the refraction effect is based on an aspheric shape of both the incident side surface and the exit side surface of the single lens element.

13. The single lens element according to claim 12, wherein a following expression is satisfied:

8.5 mm<f<9.5 mm.

14. The single lens element according to claim 12, wherein a following expression is satisfied:

4.5 mm<T<5.5 mm.

15. The single lens element according to claim 12, wherein a following expression is satisfied:

14 mm<fr<18 mm.

16. The single lens element according to claim 12, wherein a following expression is satisfied:

0.85<t/T<0.92.

17. The single lens element according to claim 1, wherein the diffraction structure is formed on both the incident side surface and the exit side surface of the single lens element.

18. A light source device for emitting a bundle of rays having a predetermined convergent state, comprising:
a semiconductor laser element which radiates a divergent bundle of rays, and has a characteristic of shifting toward a direction in which a wavelength of the radiated bundle of rays in accordance with rise in an environmental temperature;
the single lens element according to claim 1 for converting the divergent bundle of rays radiated from the semiconductor laser element, into a predetermined convergent state; and
holding means for integrally holding the semiconductor laser element and the single lens element.

19. The light source device according to claim 18, wherein the semiconductor laser element radiates a bundle of rays whose wavelength λ is within either of following ranges:

775 nm<λ<810 nm 640 nm<λ<680 nm.

20. The light source device according to claim 18, comprising the holding means for integrally holding the semiconductor laser element and the single lens element, wherein heat generated by the semiconductor laser element is transmitted to the single lens element via the holding means.

21. A scanning optical device for imaging and scanning a bundle of rays on a surface to be scanned as a spot, comprising:
a light source device for emitting a bundle of rays having a predetermined convergent state;
an optical deflector for main scanning by reflecting and deflecting the bundle of rays emitted from the light source device on a deflection surface;
a first imaging optical system for imaging the bundle of rays emitted from the light source device into a linear image extending in a main scanning direction in the neighborhood of the deflection surface of the optical deflector; and
a second imaging optical system comprising a scanning lens for re-imaging the bundle of rays imaged by the first imaging optical system on the surface to be scanned as a spot,
wherein the light source device comprises:
a semiconductor laser element which radiates a divergent bundle of rays, and has a characteristic of shifting toward a direction in which a wavelength of the radiated bundle of rays in accordance with rise in an environmental temperature;
the single lens element according to claim 1 for converting the divergent bundle of rays radiated from the semiconductor laser element, into a predetermined convergent state; and
holding means for integrally holding the semiconductor laser element and the single lens element.

22. The scanning optical device according to claim 21, wherein the light source device comprises temperature transmission means for reducing a temperature difference between the semiconductor laser element and the single lens element.

23. The scanning optical device according to claim 21, wherein the semiconductor laser element and the single lens element are fixed on a common member, and heat generated by the semiconductor laser element is transmitted to the single lens element via the common member.

24. The scanning optical device according to claim 21, wherein the semiconductor laser element comprises heat radiating means.

* * * * *